United States Patent [19]
Hatcher

[11] Patent Number: 5,924,369
[45] Date of Patent: Jul. 20, 1999

[54] TOOL FOR PLANTING SEEDS, BULBS, AND PLANTS

[76] Inventor: Curtis I. Hatcher, 5351 Hatcher Rd., Bascom, Fla. 32423

[21] Appl. No.: 08/781,180

[22] Filed: Dec. 23, 1996

Related U.S. Application Data

[63] Continuation-in-part of application No. 08/506,228, Aug. 1, 1995, abandoned.

[51] Int. Cl.[6] ..................................................... A01C 11/00
[52] U.S. Cl. .............................................. 111/92; 111/106
[58] Field of Search .................................. 111/89, 92, 95, 111/96, 72, 100, 106, 107, 108, 903, 900; 172/21, 22, 40

[56] References Cited

U.S. PATENT DOCUMENTS

| | | | |
|---|---|---|---|
| 3,126,847 | 3/1964 | Morris | 111/106 X |
| 3,170,422 | 2/1965 | Gregory | 111/96 |
| 3,517,629 | 6/1970 | Bridges et al. | 111/96 |
| 3,797,417 | 3/1974 | Hahn | 111/106 X |
| 3,929,080 | 12/1975 | Akeyson | 111/100 |
| 4,706,582 | 11/1987 | Keskilohko | 111/98 X |
| 4,736,694 | 4/1988 | Kratky et al. | 111/92 X |
| 4,995,327 | 2/1991 | Jeffers, Sr. | 111/92 X |
| 5,622,122 | 4/1997 | Adair | 111/106 |

*Primary Examiner*—Thomas B. Will
*Assistant Examiner*—Robert Pezzuto

[57] ABSTRACT

A light weight hand tool that is very easy to use in planting seeds, bulbs, and small plants in tilled soil while standing erect. The tool consists of the following components, a primary elongated tube, a transport tube, a probe and an optional soil depth control mechanism. Three embodiments are included depicting various methods of incorporating the transport tube in union with the primary tube and the probe. The transport tube consists of an elongated tube open from top end through bottom end for transporting by gravity a planted object from hand to soil. The probe consists of a short elongated rod tapered at one end with the opposite blunt end fixed inside either the bottom end port of the primary tube or the bottom end port of a short hollow tube attached adjacent and parallel to the bottom end of the primary tube. The probe may have holes positioned horizontally through its diameter and equally spaced along the length thereof as a device for manually adjusting an optional soil depth control mechanism. The soil depth control mechanism functions on the probe and consists of a circular plate having a hole centered and joined in alignment with a hollow sleeve thereby allowing movement along the probe. The depth control mechanism is attached and made stationary on the probe by a bolt nut assembly or hair pin clip inserted through a hole positioned horizontally through the sleeve and one of the several holes positioned along the length of the probe.

9 Claims, 4 Drawing Sheets

5,924,369

TOOL FOR PLANTING SEEDS, BULBS, AND PLANTS

This application is a continuation-in-part of U.S. patent application Ser. No. 08/506,228, filed Aug. 1, 1995, now abandoned.

FIELD OF THE INVENTION

The present invention relates to a versatile hand tool for planting seeds, bulbs, and plants of various sizes to a prepared seed bed. Specifically, the tool in this present invention enables a gardener to stand erect to plant to a prescribed depth and cover the seed, bulb, or plant root with soil.

BACKGROUND OF THE INVENTION

Prior art discloses numerous devices for delivering matter into the soil that consist of an elongated tubular barrel in association with a rod or tapered cone for probing a hole in the soil. Much of the prior art is devoted to devices that will place fertilizer, poison pellets or granular materials in the soil. A much greater amount of prior art depicts devices designed to plant only small tree or vegetable seedlings. A couple of prior art disclosures feature devices designed to plant seeds. In U.S. Pat. No. 4,736,694, only Kratky describes a transplanter capable of planting seeds, bulbs, and plants featuring both a dibble for probing a hole in the soil and a mechanical device for covering the planted object.

There are several attributes that appear in all prior art, including kratky. Prior devices have tube cylinders designed to store a quantity of granular or pellet material within or in an adjacent tube. Characteristically, they have a rod or dibble that must be mechanically extended past the cylinder's bottom end as a method of opening a hole in the soil. Then some type of manual manipulation of parts is required to retract the rod within the cylinder and thereby open a passageway for the material to bypass the rod and exit to the soil. Another similar device utilizes a split inverted tapered cone for soil penetration that opens upon further manual downward motion of a reciprocating plunger allowing the plunger to extract a seed that is fed to the plunger by a cylindrical conveyer housing.

All prior art is described by complicated mechanisms consisting of springs, rods, levers, cylinders, platforms, handles, straps, and other cumbersome features most of which require repetitive manipulation, and are difficult and costly to manufacture, use and maintain. Only Krathy has presented a tool to plant seeds, bulbs, and plants with soil opening and closing capability; however his tool has no soil depth control which limits its application for planting small seeds that require a precise depth. The novelty of this present invention over all prior art is that it is a tool capable of planting seeds, bulbs, and plants embodied in a simplistic device free of repetitive mechanical component manipulation for each task, that enables precise placement, soil opening capability with depth adjustment, and lateral soil coverage with a singular downward motion of the tool. Another novelty of this present invention is it features a probe large enough to open a hole in the soil which will accommodate most seeds, various size bulbs, and even live plants. A problem solved by this present invention is that the soil probe hosts a simplistic soil depth control mechanism which enables the gardener to plant seeds to a prescribed depth and with one adjustment continue planting either bulbs, or plants with the same tool. Further, the present invention allows the planted object to be covered with soil without the additional mechanisms of prior art that required manipulation. Finally, the simplicity of manufacture and operation of the present tool is superior over previous art which has complicated mechanisms and numerous interdependent working parts that could become jammed or clogged.

This present invention is a unique tool with applications not limited to planting small flower beds, entire home gardens, and even commercial projects. Another of its more applicable uses is as a tool to replant skips in existing plant stands without any disturbance to adjacent plants.

SUMMARY OF THE INVENTION

The present invention is therefore to provide a singular yet versatile hand tool suited to planting seeds, bulbs, and live plants. The tool may have more than one embodiment, but essentially consist of a primary elongated tube, held upright, having a top end and bottom end serving fully or in part as a transport tube or support member for a transport tube capable of transfering a planted object from hand to soil; a short elongated rod with a blunt top end and a tapered bottom end that serves as a soil opening device or probe, which may feature a soil depth control mechanism. The first embodiment features a primary elongated tube serving in part as a transport tube in union and open communication with a second transport tube which permits the probe blunt end to be fixed in the bottom end port of the primary tube with a bolt nut assembly and extend beyond the secondary transport tube. This secondary transport tube is attached such that the top end is inserted through the side wall and into the primary transport tube, directed toward the top end of the primary transport tube, above the probe and angled such that the secondary tube exits adjacent and parallel the primary transport tube bypassing the probe and extending just past the bottom end port of the primary tube.

The second embodiment features a primary elongated tube with a top end and bottom end, the top end with a cap and the bottom end with the probe blunt end fixed therein by means of a bolt nut assembly and extending beyond the transport tube bottom end. A second and shorter elongated tube serving as the transport tube is attached adjacent and parallel the primary tube ending flush with the bottom end of the primary tube.

The third embodiment features a singular elongated tube as the transport tube with a top end and bottom end with an open passage throughout; the bottom end having a short hollow tube as a parallel member on the outer wall ending flush with the bottom end of the transport tube; the probe blunt end being fixed within the bottom end of the short tube and extending beyond the transport tube.

The present invention may also comprise a soil depth device comprising a sleeve joined at the center of a circular horizontal plate. The horizontal plate has a circular cut out section at the center matching the open bore throughout the sleeve, and a cut out section beginning where the sleeve and plate are joined flaring outward to outer wall of the plate to permit planted objects to bypass the plate. The sleeve circumference is slightly larger than the outside circumference of the probe allowing the probe to fit in close communion through the sleeve and plate mechanism such that the mechanism can be manually moved back and forth on the probe. The sleeve mechanism can be secured such that the desired probe length extends on the bottom side of the plate. The probe can feature several holes at equal spacings along the length thereof to which a single hole through both walls of the sleeve can be aligned and attached by a bolt nut assembly or hair pin clip. This enables it to made stationary and thereby a method of adjusting the depth the probe will open the soil. The soil depth device is depicted with the first and second embodiments.

In operation, the planting tool is best used to plant a tilled or prepared seed bed that is slightly moist. When equipped with a soil depth control device, the depth should be selected by removing the bolt or hair pin clip from the sleeve and moving the mechanism to the desired position on the probe and reinstalling the bolt nut assembly or hair pin clip. Rows or sites for planting should be identified prior to beginning the planting process. With a supply of seeds, bulbs, or plants carried by means of ones' choice, planting can begin by holding the tool in a vertical position and with a downward push on the tool probe a hole in the soil. The probe should be inserted until the depth plate contacts the soil, or if a depth plate isn't used, visual observation can dictate how deep to make the hole. The probe is removed from the hole and while still in a vertical position allowed to rest gently on the ground adjacent to the hole such that the transport tube is directly above the hole. The free hand is used to select the seed, bulb, or plant (roots first) and deposit it in the top end port of the transport tube. Visual observation will determine when the item has fallen into the soil. While the tool is held in its present position another downward motion will probe another hole and thereby laterally displace soil to cover the item. Depending on the soil texture and moisture conditions, an alternate method of covering the seed is to use the probe to rake down soil from the walls of the hole. The planting process is repeated at desired spacings until completed.

The present invention solves issues cited above. Numerous advantages characterized in the present invention are: a simple and light weight tool versatile enough to plant seeds, bulbs, and plants; a probe large enough to open a soil site for proper placement of the object planted which also can be used to cover the object once planted; and an optional adjustable depth control mechanism that is precise yet simple and easy to operate. Further, this present invention achieves these versatile applications without mechanisms that require manual movement every time something is planted.

DETAILED DESCRIPTION OF THE INVENTION

Figure 1:
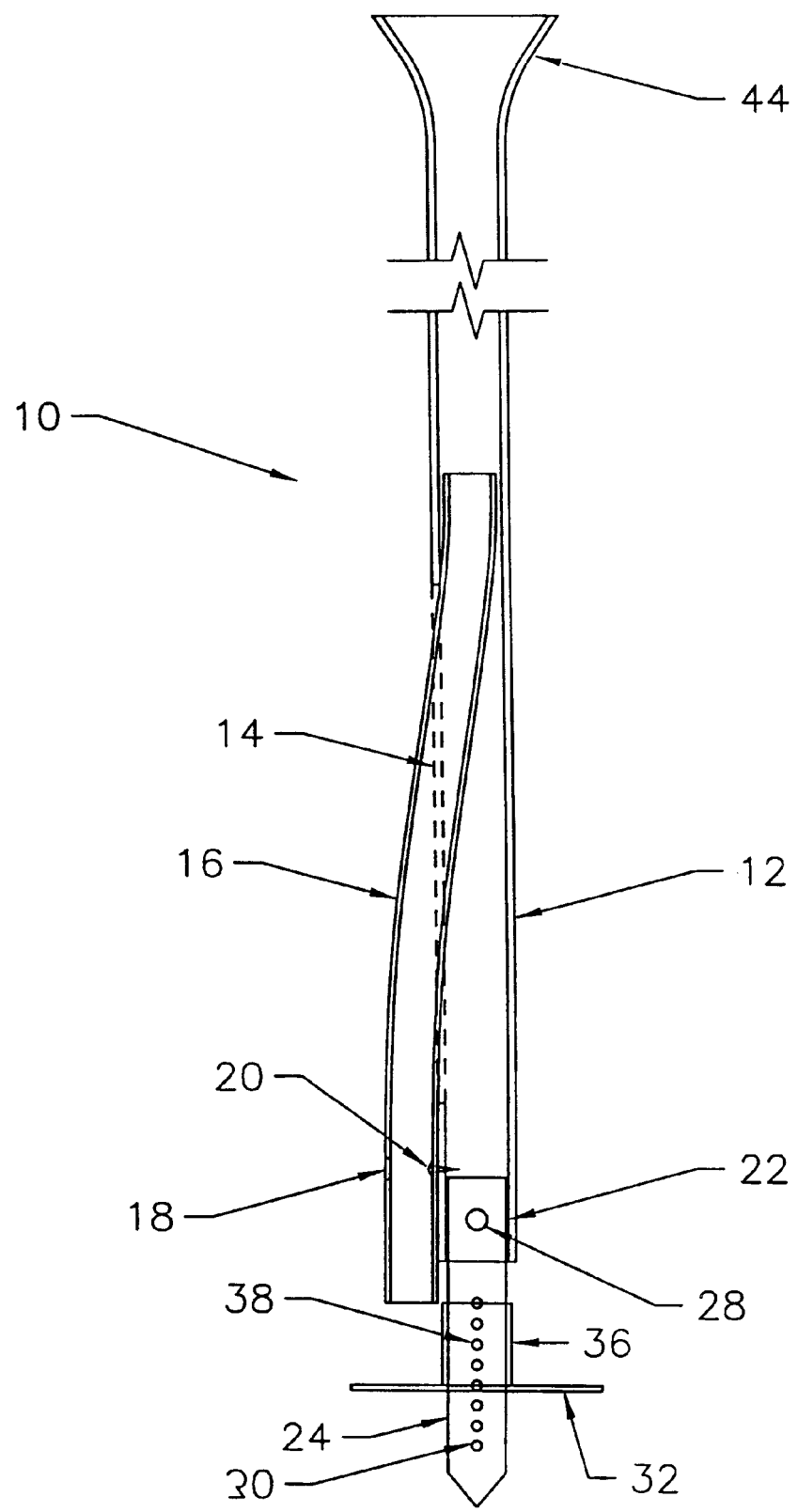
FIG. 1 is a side view of the first embodiment of the present invention in its operative position; length shortened by the break in the lines, showing a planting tool in accordance with the present invention.

The present invention will now be described in detail, as illustrated in the above mentioned drawings. The reference numbers depicted in the drawings will be consistently used to refer to the same parts.

Figure 5:
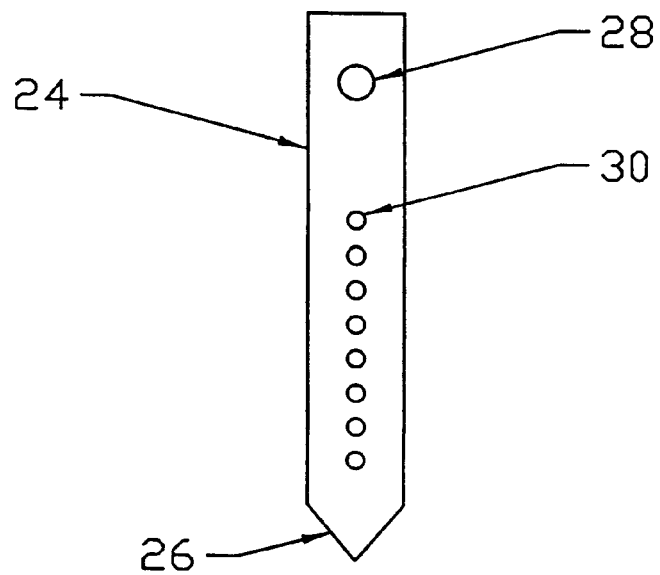
FIG. 5 is a side view of a probe depicting the hole for attaching to the tool and smaller holes for attaching a depth plate device.

The first of three embodiments of the present invention is shown in FIG. 1 in a vertical position depicting the proper angle of use. Various elements making up the tool are shown in the various views FIG. 1, 12–44. The planting tool referenced by 10 consists of a cylindrical elongated primary transport tube 12 having a top open entry port 44 and bottom open exit port having an open sphere the duration of its length 44, 14, 16. The entry port 44 may be shaped in the form of a funnel, but not required. The bottom end port of the primary transport tube 12 has a short cylindrical bushing 22, slightly smaller in diameter than the elongated tube 12, installed inside and flush with the bottom end. A hole 28 through the primary transport tube and bushing provides a base receptacle for securing and attaching with a bolt nut assembly an elongated cylindrical rod 24 having a blunt top end and tapered bottom end with a similar sized hole near the top blunt end 28, (FIGS. 1, 5). The bottom end of the rod 24 is tapered FIG. 5, 26 which enables it to serve as a soil opening device or probe 24.

Figure 3:
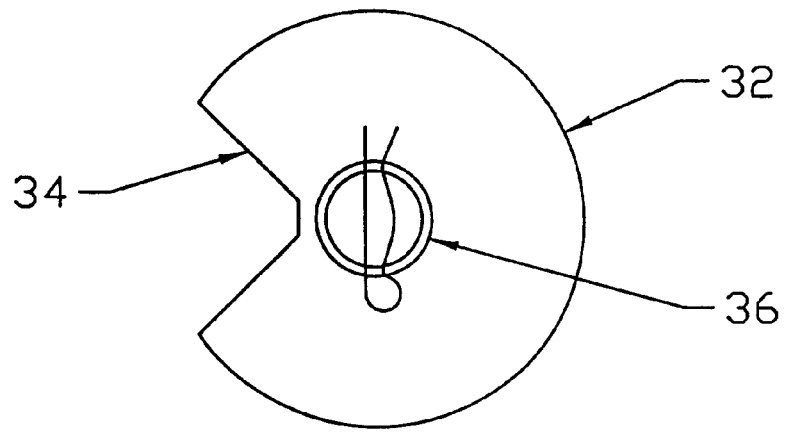
FIG. 3 is an overhead view of a depth plate device apart from the probe.

The probe may include small equally spaced holes 30 along the exposed length to permit the attachment of a soil depth plate mechanism FIG. 3. Alignment of these holes 30 and the one attaching the probe in the base receptacle 28 are parallel to the tapered "V" end 26 such that the horizontal plate cut out 34 is positioned horizontally thereto placing the cut out 34 directly under the transport tube exit port. The soil depth plate mechanism FIG. 3 is secured in place with a hair pin clip or bolt nut assembly 36 installed through a hole in the sleeve 38 and a selected hole 30 on the probe. When the tool 10 is held vertically and pressed downward, the depth plate 32 will contact the soil and limit the probed depth.

The first embodiment has an elongated cylindrical transport tube 16 that bypasses the probe located in the bottom end of the primary transport tube 22. The bypass tube 16 must be smaller than the primary transport tube 12 as it is fitted inside the primary tube 12 through a cut out 14 in the primary tube side wall. The bypass tube 16 must be formed and shaped to permit insertion of its top open end into the primary tube 14 with the remainder 16 exiting parallel and conforming adjacent to the primary tube 12 to a point just past the bottom end of the primary tube 16. The cut out 14 and bypass transport tube 16 must be perpendicular to the hole attaching the probe 28.

Figure 2:
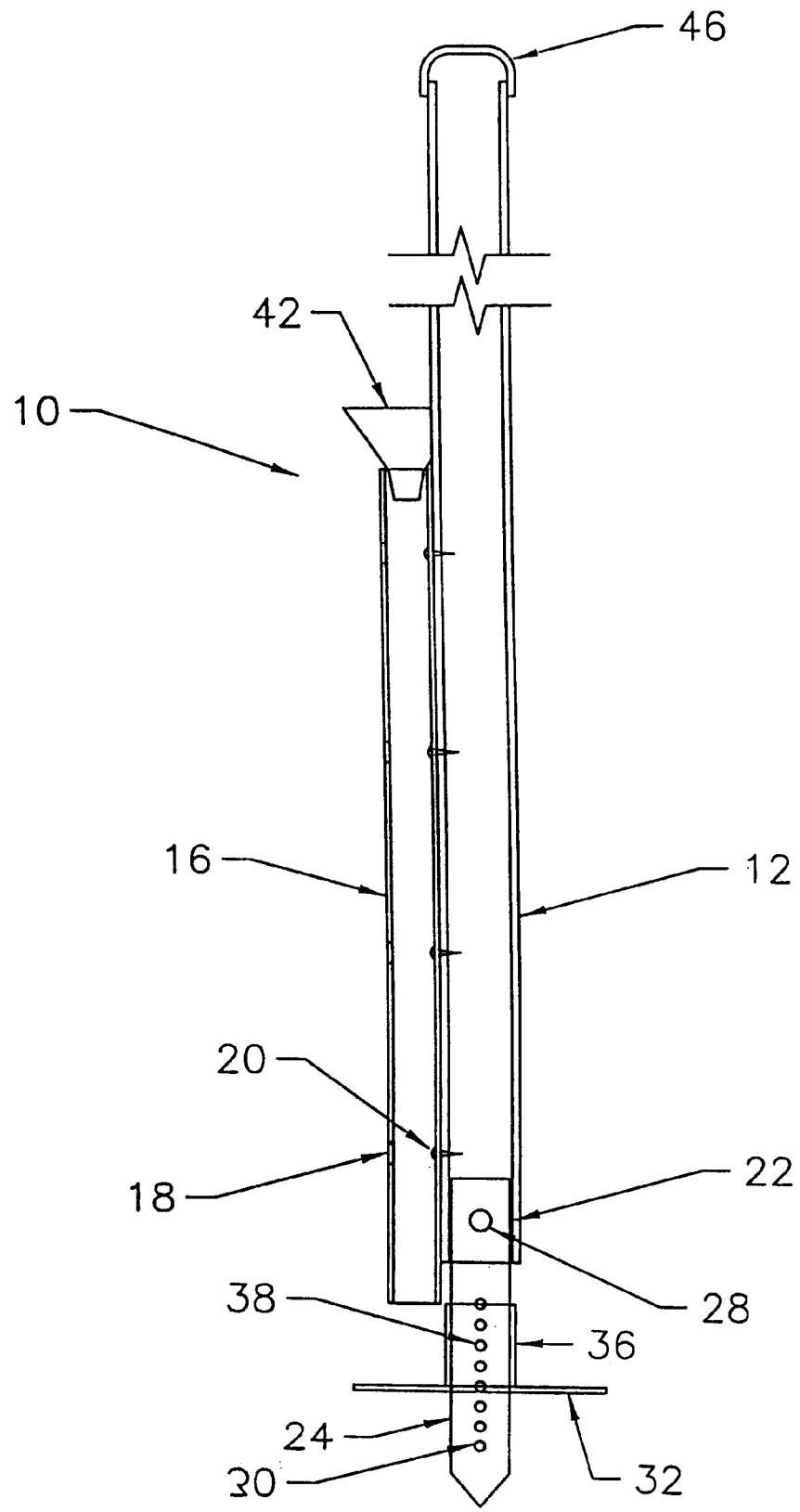
FIG. 2 is a vertical view of the second embodiment of the present invention in its operative position, length shortened by the break in the lines, showing a planting tool in accordance with the present invention.
Figure 4:
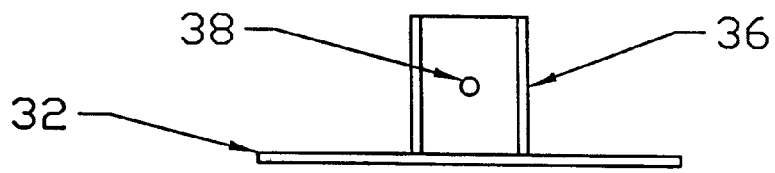
FIG. 4 is a side view of a depth plate device part from the probe and connect hair pin clip.

In the second embodiment FIG. 2, 10, the primary tube 12 serves as a handle to which a shorter elongated transport tube 16 attaches parallel. Both the primary tube 12 and transport tube 16 have a top end and bottom end. The transport tube has an open passage extending from the top end through the bottom end. As in the first embodiment FIG. 1, the primary tube 12 also serves as a base receptacle 22 for a probe 24. If screws 20 are used to attach the transport tube 16 to the primary tube 12, different size transport tubes can be used depending upon the item to be planted. Installation of screws requires alignment of access holes 18 in the transport tube 16. With a smaller transport tube 16, a funnel 42 may be used in the top end port. A larger transport tube permits planting seeds, bulbs, and plants and can alleviate the need to change sizes. A cap 46 may cover the top end of the primary tube 12. This embodiment FIG. 2 may feature a probe 24 and soil depth plate mechanism 32 as described in the first embodiment FIGS. 3, 4, & 5.

Figure 6:
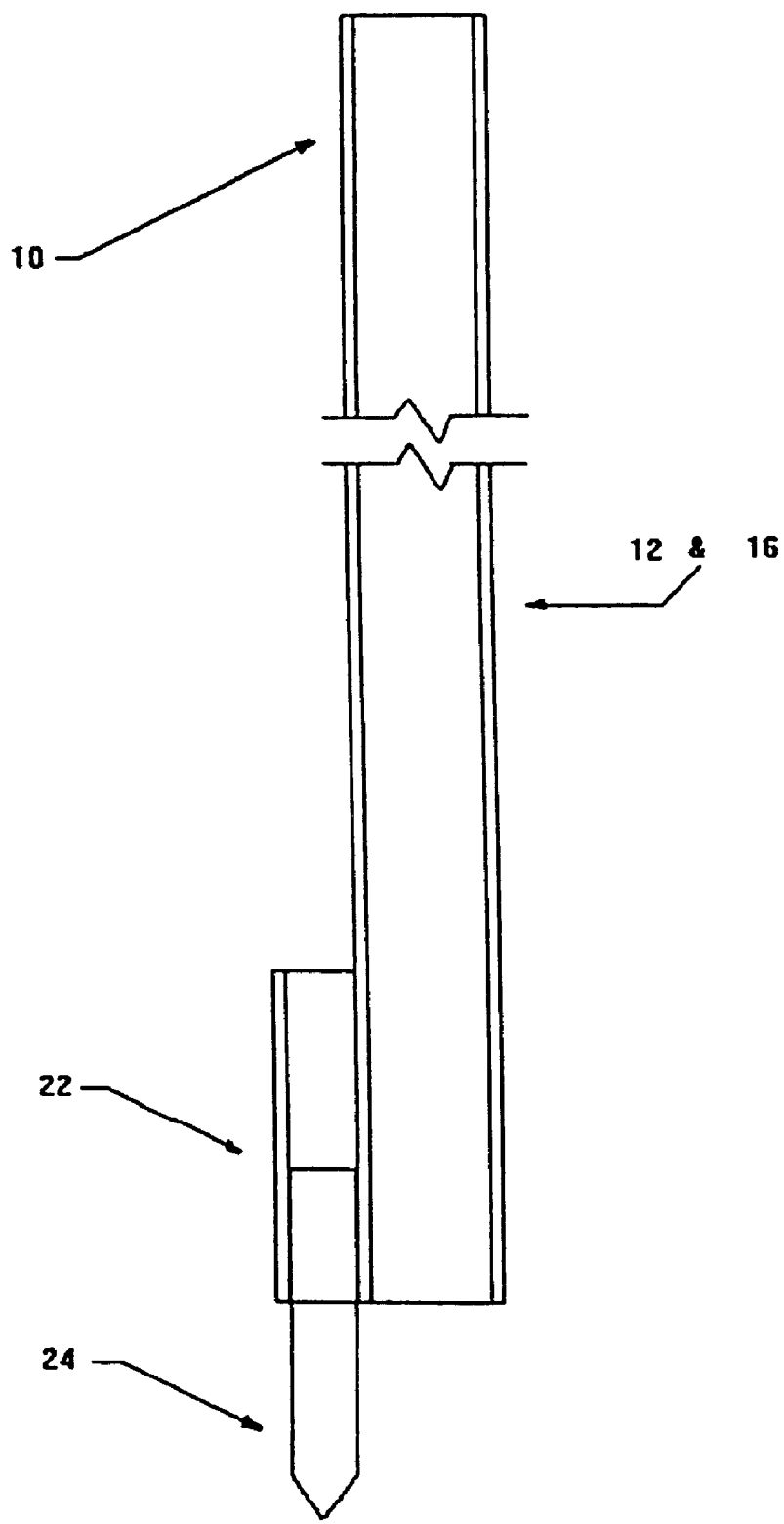
FIG. 6 is a side view of a third embodiment of the present invention in its operative position; length shortened by the break in the lines, featuring a planting tool in accordance with the present invention.

The third and preferred embodiment of the present invention FIG. 6, 10 depicts an even more simplified version of the tool 10. It features a primary elongated transport tube 12

& 16, with a top end and bottom end and open passage there through large enough in diameter to plant most seeds, bulbs, and small plants. This embodiment FIG. 6, 10 off sets the probe 24 from the transport tube 12 & 16 bottom end, thus freeing the tube to serve exclusively as the transport tube 12 & 16. A base receptacle 22 for a probe is attached by joining a short hollow tube 22 parallel and flush to the bottom end of the transport tube 12 & 16. The top end of the short hollow tube 22 may have a cover insert fitted flush at the top. The probe 24 may be glued or attached in the hollow tube 22 adjacent to the bottom end of the transport tube 12 & 16 by means of a bolt nut assembly 28 as described in other embodiments FIGS. 1 & 2. Although possible, the probe 24 in this embodiment doesn't feature a soil depth plate mechanism 32.

In operation, a planting tool described in the present invention may be used to plant a plurality of seeds, bulbs, or plants in gardens, flower beds, or commercial endeavors. The tool is best used to plant a tilled or prepared seed bed that is slightly moist. Rows or sites for planting should be identified prior to beginning the planting process. A supply of seeds, bulbs, or plants can be carried by means of ones' choice. When the tool 10 is equipped with a soil depth control mechanism FIGS. 3 & 4, as shown in FIGS. 1 & 2, the operator should adjust the soil depth control mechanism 32 by removing the hair pin clip or bolt 36 from the sleeve 38. The soil depth control mechanism 32 can then be moved along the probe 24 in either direction to a position that will give the desired probe length 30, 32. The hair pin clip 36 can then be inserted in a hole 38 in the sleeve and one in the probe 30 corresponding to this position.

Planting can begin by holding the tool 10 vertically in operative position as shown in FIGS. 1, 2, & 6, grasping the primary tube FIGS. 1 & 2, 12, FIG. 6, 12 & 16 by one hand near the top end FIG. 1, 44, FIG. 2, 46 or near the top end port FIG. 6. The operator can now visually select the site, position the probe 24 in contact with the soil at that site, and give a downward push to cause the probe 24 to open a hole in the soil. Enough force should be applied to cause the depth plate 32 to come in contact with the soil, or if a depth plate mechanism isn't used, the depth can be determined by visual observation. The tool 10 is then lifted to remove the probe 24 from the soil and positioned so the probe 24 rests in the vertical position on top of the soil adjacent to the hole such that the bottom end port of the transport tube 16 is directly above the hole. While continuing to hold the tool 10 in a vertical position, the operator may use his or her free hand to select the seed, bulb, or plant (roots first) from whatever transport means they have and deposit it in the top end port 42, 44 of the transport tube 16. The object planted will fall by gravity through the transport tube 16 into the soil. The planted object can now be covered with soil by continuing to hold the tool 10 in the same position and making another downward push to probe another hole. This will laterally displace soil to cover seeds and bulbs and only the roots of plants leaving them in an upright position. Depending on the soil texture and moisture conditions, an alternate method of covering the planted object is to use the probe 24 to rake down soil from the walls of the hole. The operator then selects the next planting site and repeats the process. Once the operator becomes accustomed to the tool, 10 a steady pace can be established that permits planting to proceed at a rapid rate.

Individuals skilled in the art will readily recognize that the tool described in this present invention may be constructed of various materials. Further, the size and shape of various components may be altered. In summary, the description herein has presented this present invention in three embodiments, the preferred being depicted in FIG. 6, and it is understood many alterations can be made without losing the essence of the present invention as defined by the following claims.

What is claimed is:

1. A hand tool for planting seeds, bulbs, and plants in tilled soil, said tool comprising:

a primary elongated transport tube comprising a top end and a bottom end, said top end serving as an entry port and said bottom end as a receptacle base to which a soil opening device or probe is attached, recognizing a secondary transport tube which being of slightly smaller circumference dimension than the primary transport tube is angled to permit a top end section of the secondary transport tube to fit through a cut out section in the side wall of the primary transport tube thereby be an internal fixed member of the primary transport tube, said internal fixed member located in the primary transport tube above the receptacle base for the probe and angled such that the portion of internal fixed member extending from the outer wall of the primary transport tube extends adjacent and parallel to the primary transport tube ending slightly beyond the bottom end of the primary transport tube, thereby achieving an open continuous passage way from the top end port of the primary transport tube detouring through and continuing to the bottom end port of the secondary transport tube, both the primary and secondary transport tubes being of sufficient diameter to allow gravitational transfer of a planted object there through;

a soil opening device or probe consisting of an elongated rod having a blunt top end and a tapered bottom end with the blunt top end of said probe having a circumference to permit the blunt top end to be fixed securely by bolt nut assembly within the said receptacle base of the primary transport tube;

a soil depth control mechanism comprising a sleeve and circular horizontal plate formed as one mechanism having a hole through the center of the sleeve and plate, said hole being of a circumference said probe extends through said hole thereby allowing said soil depth mechanism as an adjustable member by manual movement to different positions on said probe and secured with a small bolt nut assembly or hair pin clip through a hole in the sleeve, said hole horizontal with said plate, and in alignment with several corresponding holes positioned horizontally through said probe and equally spaced along the exposed length of said probe.

2. A hand tool as described to claim 1, further comprising:

a primary transport tube with the top end entry port having a funnel shaped configuration;

a sleeve fitted within the bottom end of said primary transport tube having a hole drilled through said primary transport tube and sleeve to provide a means for securing the blunt end of said probe fitted therein such that said hole aligns perpendicular to the bottom end exit port of said secondary transport tube.

3. A hand tool as described in claim 1, wherein the primary transport tube also serves as a handle.

4. A hand tool as described in claim 1, wherein said soil opening device consists of an elongated rod with a blunt top end with a hole positioned horizontally near said top end permitting the rod to be secured by means of a bolt and nut assembly in said base receptacle of the primary transport tube, said probe having a tapered bottom end, and said hole located near the blunt top end in parallel alignment with said several horizontal holes equally spaced along the length of said probe.

5. A hand tool as described in claim 1, wherein said soil depth control mechanism has a cut out section in the horizontal plate extending from a point where the sleeve joins said plate and flaring outwardly to the outer edge of said plate such that said cut out section forms a V shape which is aligned perpendicular with the hole in said soil depth control sleeve.

6. A hand tool described in claim 1, wherein said soil depth control mechanism is an optional attachment.

7. A hand tool for planting seeds, bulbs, and plants, said tool comprising:

- a primary elongated tube having a top end and bottom end as a support member for a secondary elongated tube serving solely as a transport tube;
- a transport tube, also having a top end and bottom end, attached parallel and adjacent to said primary tube extending from a point below the top end of said primary tube to a position flush with the bottom end of said primary tube; said transport tube being attached with four screws accessed by means of holes aligned at equal spacings along the length of said secondary transport tube;
- a cap covers the top open end of said primary tube with the bottom end of said primary tube serving as a receptacle base for a soil opening device or probe;
- a funnel is fixed in the open entry port of the top end of said transport tube;
- a soil opening device or probe comprising an elongated rod having a blunt top end and a tapered bottom end with the blunt top end of said probe having a circumference to permit the blunt top end to be fixed securely by bolt nut assembly within said receptacle base of the primary tube;
- a soil depth control mechanism comprising a sleeve and circular horizontal plate formed as one mechanism having a hole through the center of the sleeve and plate, said hole being of a circumference said probe extends through said hole thereby allowing said soil depth mechanism as an adjustable member by manual movement to different positions on said prove and secured with a small bolt nut assembly or hair pin clip through a hole in the sleeve, said hole horizontal with said plate and in alignment with several corresponding holes equally spaced along the exposed length of said probe.

8. A hand tool as described in claim 1, further comprising:

- a sleeve fitted within the bottom end of said primary tube having a hole drilled through said primary tube and sleeve to provide a means for securing the blunt end of said probe fitted therein such that said hole aligns perpendicular to the bottom end exit port of the primary tube.

9. A hand tool as described in claim 7, wherein said transport tube can be removed from said primary tube by removal of screws attaching the two members, thereby allowing the exchange of different size secondary transport tubes.

* * * * *